UNITED STATES PATENT OFFICE.

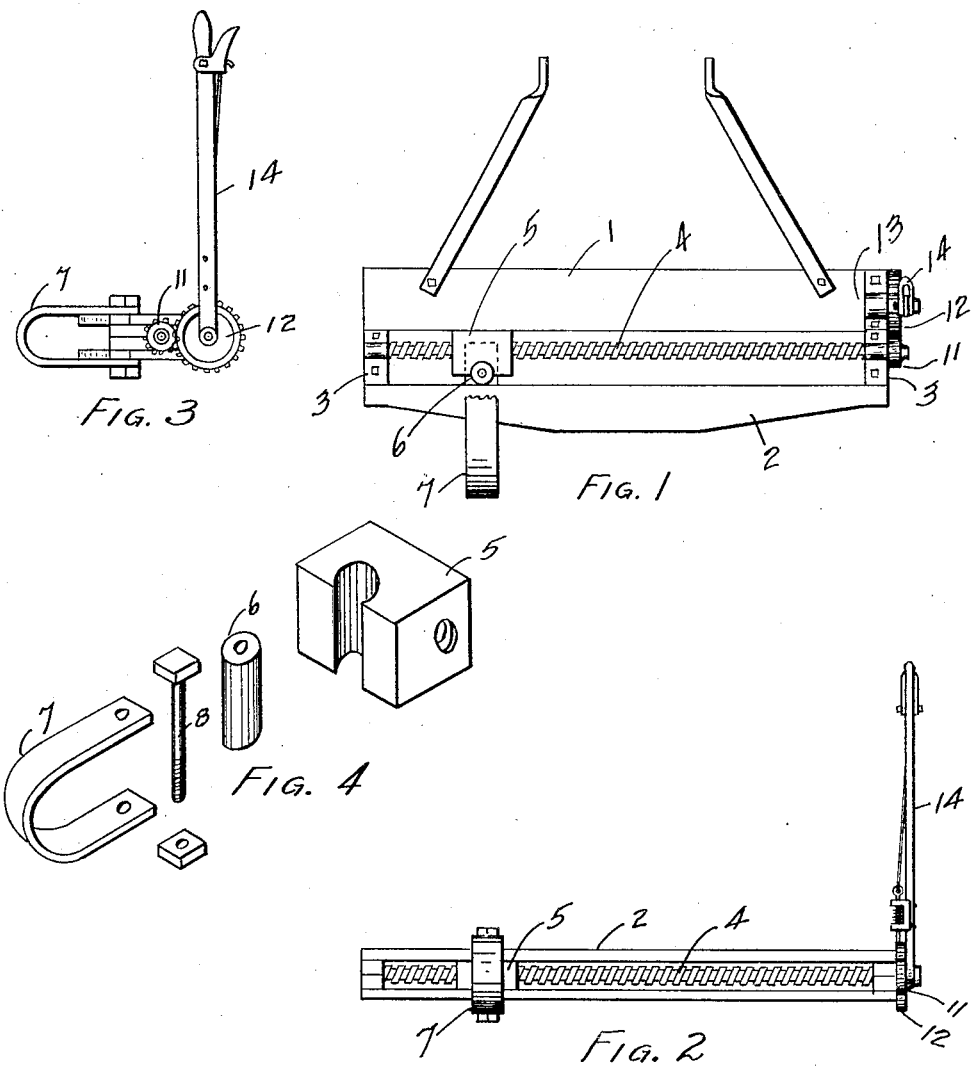

THOMAS G. EUBANKS AND JOHN B. BENNETT, OF WALLA WALLA, WASHINGTON.

PLOW-HITCH.

1,354,288.  Specification of Letters Patent.  Patented Sept. 28, 1920.

Application filed May 14, 1919. Serial No. 297,058.

*To all whom it may concern:*

Be it known that we, THOMAS G. EUBANKS and JOHN B. BENNETT, citizens of the United States, residing at Walla Walla, in the county of Walla Walla and State of Washington, have invented certain new and useful Improvements in Plow-Hitches, of which the following is a specification.

This invention relates to plow hitches and has for its object to provide a means whereby the draft of a machine may be changed from side to side at the will of the operator, with no frictional resistance against the lateral operation of the clevis, and whereby the operative parts are in easy reach of the operator.

This invention is more particularly adapted for use on tractors used in plowing hilly ground as in this work it is found necessary to head the plow slightly up hill to overcome the effects of the sloping ground. As the degree of slope is constantly changing it is necessary to change the draft to correspond, hence the necessity of this invention.

That the invention may be better understood reference is had to the accompanying drawings in which—

Figure 1 is a plan view of the device;

Fig. 2 is a rear elevation thereof;

Fig. 3 is an end elevation;

Fig. 4 is a perspective view of the block, roller, pin and clevis;

Figure 5:
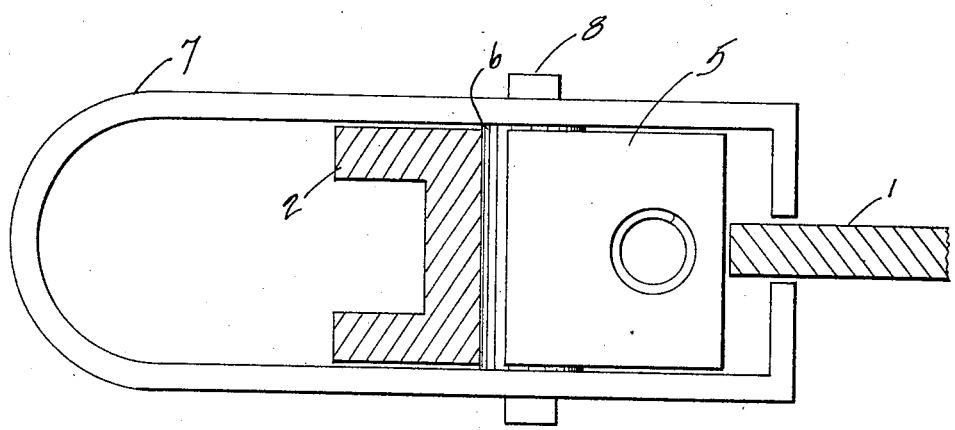
Fig. 5 shows a preferred form of clevis.

Like numerals represent like parts throughout and 1 represents the front plate of the frame which is united with the rear plate 2 by means of the connecting pieces 3 in which is journaled the worm 4. On this worm is a block 5, positioned horizontally thereon and carrying a roller 6 arranged vertically, and journaled in said block with one of its edges exposed through this journal to engage the rear plate 2 of the frame.

Astride the rear frame 2 and mounted on the roller is a clevis 7, the mounting being accomplished by means of the pin (or bolt) 8 which passes through the clevis 7 and the roller 6. The clevis is maintained in a horizontal position by means of the rear plate 2 which acts as a guide for the clevis.

Figure 6:
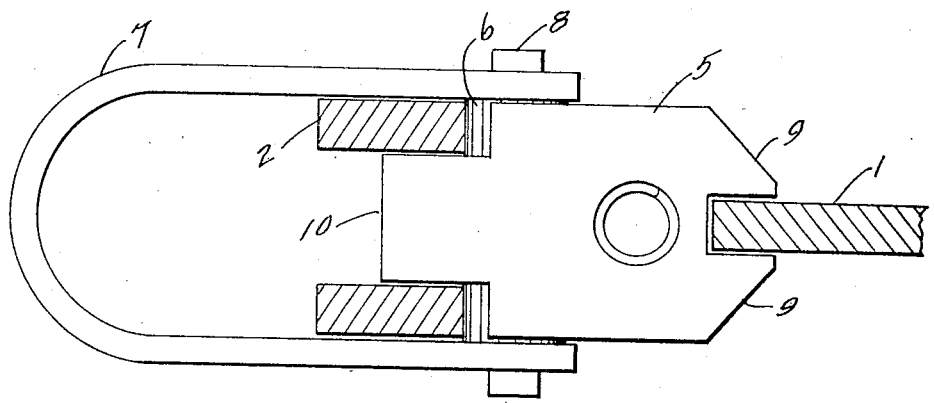
Fig. 6 shows a modified form of block.

For further stability the clevis may project over the block with its ends brought in register with the front plate 1 as shown in Fig. 5. This is our preferred form although the form shown in Fig. 6 may be adopted if desired. In Fig. 6 the block 5 has projecting lugs 9 which register with the aforementioned front plate 1. Fig. 6 also shows the rear plate 2 composed of two pieces in contradistinction to that shown in Fig. 5 and where this two piece form is used a projecting lug 10 may extend from the block 5 to register in the groove formed by the two pieces. The idea in thus guiding the block being to prevent the block from binding on the worm 4 and, as it is essential that the clevis maintain its horizontal position, by using the clevis ends as a guide on the front plate it answers the double purpose of maintaining the clevis in position and as a guide to the block against binding on the worm.

On the end of the worm is fastened a pinion 11 which meshes with a spur gear 12 which is mounted on the frame on a stub shaft as at 13. A ratchet lever handle 14 is revolubly mounted on the stub shaft and is arranged to engage the teeth of the spur gear by which means the worm 4 is revolved and the block and clevis moved laterally.

One of the principal features of this hitch is that the pull comes against the plate 2 and away from the journal of the roller, and the block. By this means we prevent any strain whatever coming on the worm, all pressure is relieved from the journal and the pull comes directly through the pin 8 and roller 6 against the rear plate 2; by which means we practically eliminate all friction and are thus enabled to move the block and clevis with very little muscular effort being exerted on the lever handle.

In use the device is attached to a tractor and a plow or other implement attached to the clevis in the usual manner; the tractor is then driven to the field of operation and the implement is kept in its proper track by shifting the clevis to the proper position demanded by the degree of slope of the ground.

It is understood that changes can be made in the design and construction of the device without departing from the spirit of the invention.

Now having explained our invention we claim—

1. In a plow hitch, the combination of a slotted frame having a front and rear plate and having a worm operably mounted in said frame, and a block operably mounted on said worm and slidably mounted on said plates, a roller mounted in said block and positioned to engage the inner side of said rear plate, and a clevis mounted on said roller and positioned slidably astride said rear frame in a manner to maintain a relatively horizontal position thereto and to act as a guide to said block against disalinement.

2. In a plow hitch, the combination of a slotted frame having a front and rear plate and having a worm operably mounted in said frame, and a block operably mounted on said worm and maintained in true alinement therewith by projecting lugs, said projecting lugs attached to said block and positioned to register slidably with said plates, a roller operably mounted in said block with a portion of its surface exposed to engage the inner side of said rear plate, and a clevis mounted on said roller and positioned astride said rear frame in a manner to maintain a relatively horizontal position thereto and to act as a guide to said block against disalinement.

In testimony whereof we affix our signatures.

THOMAS G. EUBANKS.
JOHN B. BENNETT.